US011719543B2

(12) United States Patent
Song et al.

(10) Patent No.: US 11,719,543 B2
(45) Date of Patent: Aug. 8, 2023

(54) COURSE GUIDANCE METHOD FOR EFFICIENT SAILING OF SHIP

(71) Applicant: SEAVANTAGE LTD., Seoul (KR)

(72) Inventors: Hyung Jin Song, Seoul (KR); Dong Il Park, Dongducheon-si (KR); Ji Goo Kim, Incheon (KR)

(73) Assignee: SEAVANTAGE LTD., Seoul (KR)

( * ) Notice: Subject to any disclaimer, the term of this patent is extended or adjusted under 35 U.S.C. 154(b) by 109 days.

(21) Appl. No.: 17/434,982

(22) PCT Filed: Jan. 23, 2020

(86) PCT No.: PCT/KR2020/001144
§ 371 (c)(1),
(2) Date: Aug. 30, 2021

(87) PCT Pub. No.: WO2020/189888
PCT Pub. Date: Sep. 24, 2020

(65) Prior Publication Data
US 2022/0146266 A1 May 12, 2022

(30) Foreign Application Priority Data
Mar. 20, 2019 (KR) .......................... 10-2019-0031604

(51) Int. Cl.
*G06V 10/82* (2022.01)
*G01C 21/34* (2006.01)
(Continued)

(52) U.S. Cl.
CPC ........... *G01C 21/203* (2013.01); *G06F 18/23* (2023.01); *G08G 3/00* (2013.01); *H04W 4/024* (2018.02); *G01C 21/32* (2013.01); *G06F 16/29* (2019.01)

(58) Field of Classification Search
CPC ...... G08G 3/00; G01C 21/203; G01S 5/0236; G01S 5/0027; G01S 5/0018; G06F 18/23; G06F 16/29
See application file for complete search history.

(56) References Cited

U.S. PATENT DOCUMENTS

| 8,674,854 | B2 * | 3/2014 | Lee | ........................... G08G 3/02 |
| | | | | 701/410 |
| 9,786,183 | B2 * | 10/2017 | Short | ....................... G08G 3/00 |

(Continued)

FOREIGN PATENT DOCUMENTS

| CN | 103828401 A | * | 5/2014 | ........... G01C 21/206 |
| CN | 106875753 A | * | 6/2017 | ............... G08G 3/00 |

(Continued)

OTHER PUBLICATIONS

"Prediction of Vessel Arrival Time Using Auto Identification System Data" by Hyeonho Kwun1 and Hyerim Bae, International Journal of Innovative Computing, Information and Control ICIC International ○c 2021 ISSN 1349-4198 vol. 17, No. 2, Apr. 2021 pp. 725-734. (Year: 2021).*

(Continued)

*Primary Examiner* — Cuong H Nguyen
(74) *Attorney, Agent, or Firm* — Stein IP, LLC (57) ABSTRACT

Disclosed herein is a course guidance method for the efficient sailing of a ship. The course guidance method for the efficient sailing of a ship is performed by a ship's course guidance system, and may include: a per-ship location information extraction step of extracting location information for each ship from collected Auto Identification System (AIS) data; a ship location plotting step of plotting the location of the ship based on the location information on an electronic navigational chart; a clustering step of clustering points located within a predetermined area among a plurality of points plotted on the electronic navigational chart; a (Continued)

course network generation step of generating ship course networks using the clustered points; and a recommended course acquisition step of acquiring a recommended course for each ship based on the generated ship course networks.

4 Claims, 9 Drawing Sheets

(51) Int. Cl.
*G01C 21/32* (2006.01)
*G01C 21/20* (2006.01)
*H04W 4/024* (2018.01)
*G08G 3/00* (2006.01)
*G06F 18/23* (2023.01)
*G06F 16/29* (2019.01)

(56) References Cited

U.S. PATENT DOCUMENTS

| | | | |
|---|---|---|---|
| 11,091,237 B2 * | 8/2021 | Kikuchi | B63B 49/00 |
| 2017/0001699 A1 * | 1/2017 | Macikunas | G08G 3/00 |
| | | | 701/1 |
| 2020/0049508 A1 * | 2/2020 | Carnevali | G01C 21/3605 |

FOREIGN PATENT DOCUMENTS

| | | | | | |
|---|---|---|---|---|---|
| CN | 108366227 | A | * | 8/2018 | G08G 3/00 |
| CN | 108806335 | A | * | 11/2018 | G08G 3/00 |
| CN | 102466119 | B1 | * | 7/2020 | G08G 3/00 |
| CN | 112650237 | A | * | 4/2021 | G06F 16/29 |
| CN | 112862156 | A | * | 5/2021 | G01C 21/203 |
| CN | 114088097 | A | * | 2/2022 | G01C 21/203 |
| CN | 114564545 | A | * | 5/2022 | G06G 18/23 |
| DE | 102019216449 | A1 | * | 4/2021 | G08G 3/00 |
| EP | 2995908 | A1 | * | 3/2016 | G01C 21/3476 |
| EP | 3739295 | A1 | * | 11/2020 | G01C 21/203 |
| JP | 3641582 | B2 | * | 4/2005 | B63B 49/00 |
| JP | 2009-286230 | A | | 12/2009 | |
| JP | 2015-135545 | A | | 7/2015 | |
| KR | 10-1103455 | B1 | | 1/2012 | |
| KR | 101103455 | | * | 1/2017 | G01C 21/203 |
| KR | 10-1850866 | B1 | | 4/2018 | |
| KR | 101850866 | B1 | * | 4/2018 | G08G 3/00 |
| KR | 10-2018-0076936 | A | | 7/2018 | |
| KR | 20190011400 | A | * | 2/2019 | G08G 3/00 |
| KR | 10-2031151 | B1 | | 10/2019 | |
| WO | WO-2015107805 | A1 | * | 7/2015 | B63B 49/00 |
| WO | WO-2018216536 | A1 | * | 11/2018 | G05D 1/0206 |

OTHER PUBLICATIONS

A. Dahlbom and L. Niklasson, "Trajectory clustering for coastal surveillance," 2007 10th International Conference on Information Fusion, Quebec, QC, Canada, 2007, pp. 1-8, doi: 10.1109/ICIF.2007.4408114.*
B. H. Soleimani, E. N. De Souza, C. Hilliard and S. Matwin, "Anomaly detection in maritime data based on geometrical analysis of trajectories," 2015 18th Inter.Conf. on Information Fusion (Fusion), Washington, DC, USA, 2015, pp. 1100-1105 (Year: 2015).*
B. Murray and L. P. Perera, "A Data-Driven Approach to Vessel Trajectory Prediction for Safe Autonomous Ship Operations," 2018 Thirteenth International Conference on Digital Information Management (ICDIM), Berlin, Germany, 2018, pp. 240-247, doi: 10.1109/ICDIM.2018.8847003. (Year: 2018).*
Marking clustering points using GMaps.js by R. I. Pienaar Jan. 5, 2015 (Year: 2015).*
"Data mining approach for automatic ship-route design for coastal seas using AIS trajectory clustering analysis", Daheng Zhang et al.; Ocean Engineering, vol. 236, Sep. 15, 2021, 109535 (Year: 2021).*
"Data mining approach to shipping route characterization and anomaly detection based on AIS data" by H. Rong et al.; Ocean Engineering vol. 198 (2020) 106936 (www.elsevier.com/locate/oceaneng (Year: 2020).*
International Search Report dated May 13, 2020, issued to International Application No. PCT/KR2020/001144.
Korean Office Action dated May 28, 2019, issued to corresponding Korean Application No. 10-2019-0031604.

* cited by examiner

COURSE GUIDANCE METHOD FOR EFFICIENT SAILING OF SHIP

CROSS-REFERENCE TO RELATED APPLICATIONS

This application is a national stage of International Application No. PCT/KR2020/001144, filed Jan. 23, 2020, which claims the benefit of Korean Application No. 10-2019-0031604, filed Mar. 20, 2019, in the Korean Intellectual Property Office, the disclosures of which are incorporated herein by reference.

TECHNICAL FIELD

The present disclosure relates to a course guidance method for the efficient sailing of a ship.

BACKGROUND ART

In general, since fuel cost accounts for the largest portion in the operation of a ship, attempts have been continuously made to reduce the fuel cost by optimizing the operation of the ship. In connection with this, Korean Patent Application Publication No. 10-2018-0076936 proposes a technology for estimating marine environmental information around a ship through the installation of a camera and various types of measurement sensors on the ship and providing guidance on the optimal course of the ship. However, the conventional sensor-based technology has acted as a high entry barrier for small and medium-sized shipping companies because the cost for the installation of the sensors on a ship and the cost for the annual maintenance of the sensors are high.

Meanwhile, Korean Patent No. 10-1103455 proposes a technology for providing an optimal course by using the Auto Identification System (AIS) data of a ship. Since the AIS data includes basic information about the ship and the ship's current marine location, the ship's location can be identified through the AIS data. The ship information (e.g., the name of the ship, the ID of AIS equipment, a ship identification number, a call sign, the type of ship, etc.) included in the AIS data is directly entered by a user into the AIS equipment provided in the ship. Accordingly, when information is entered, there is a possibility that information different from actual information may be entered due to the user's mistake or intention, and thus the reliability of data is low accordingly. Therefore, it is not easy to determine the exact specification information of a ship in operation based only on AIS data.

In addition, the conventional ship course guidance system is based on a method of providing only the shortest course based on a predetermined depth of water during course guidance, so that the specification of a ship scheduled to be operated is not sufficiently taken into consideration. In other words, conventionally, guidance on a course connecting a ship's departure point and destination is provided and the two points are connected along the shortest distance across an area where the depth of water is higher than a predetermined reference value, so that providing guidance on a port by taking into consideration a ship's specification is limited. Therefore, the development of a new technology that may provide guidance on an optimal course for each ship specification is required.

DISCLOSURE

Technical Problem

The technical spirit of the present disclosure intends to overcome the above-described problems, and an object of the present invention is to provide a technology that may acquire an optimal course without installing sensors for checking a ship for its performance, calculating optimal operating speed, and then saving fuel.

Another object of the present disclosure is to provide a technology that may provide guidance on an optimal course for each ship specification by taking into consideration the type and size of a ship.

The objects to be achieved by the present invention are not limited to the above-mentioned objects, and other objects that are not mentioned will be clearly understood by those of ordinary skill in the art to which the present invention pertains from the following description.

Technical Solution

In order to accomplish the above objects, as an aspect of the present invention, there is provided a course guidance method for the efficient sailing of a ship, the course guidance method being performed by a ship's course guidance system, the course guidance method including: a per-ship location information extraction step of extracting location information for each ship from collected Auto Identification System (AIS) data; a ship location plotting step of plotting the location of the ship based on the location information on an electronic navigational chart; a clustering step of clustering points located within a predetermined area among a plurality of points plotted on the electronic navigational chart; a course network generation step of generating ship course networks using the clustered points; and a recommended course acquisition step of acquiring a recommended course for each ship based on the generated ship course networks.

At the per-ship location information extraction step, location information may be extracted for each International Maritime Organization (IMO) number of a corresponding ship; at the ship location plotting step, the overall area of the electronic navigational chart may be segmented into square-shaped cells having a predetermined size, and a main point selection area formed along a boundary line of each of the cells and also formed to have a predetermined area in the direction of the center of the cell from the boundary line of the cell may be included in the cell; at the clustering step, points present in the main point selection area may be clustered, the clustered points may be extracted as main points, and main points present in the same main point selection area may be analyzed on a per-time basis and classified into entry and exit points; at the course network generation step, a course network may be generated by connecting the entry and exit points, in which case the location of the ship based on the location information is incorporated into the course network; and, at the recommended course acquisition step, a recommended course may be selected from a plurality of generated course networks by taking into consideration at least one of a shortest condition and an obstacle condition, the shortest condition may include at least one of the movement distance and movement time of the ship, and the obstacle condition may include at least one of weather information and dangerous area information.

Furthermore, the course guidance method may further include: a main stopping point generation step of selecting each point having the same per-time location for a predetermined period among the ship locations plotted on the electronic navigational chart as a stopping point, and generating a plurality of selected stopping points as a main stopping point by clustering the selected stopping points;

and an additional main point selection step of checking whether entry and exit points are present in the main point selection area, and generating virtual entry and exit points in a main point selection area in which entry and exit points are not present (hereinafter referred to as the 'non-included area'); at the additional main point selection step, lines passing through the non-included area may be made by connecting one of the location points of the ships plotted in the cell having the non-included area with an entry or exit point of each of the cells adjacent to the cell having the non-included area, and any one of points constituting each of the lines may be selected as a virtual entry or exit point.

In addition, the course network generation step may include: a course clustering step of determining the similarities between course networks using a Hausdorff distance algorithm and clustering course networks having a similarity equal to or higher than a predetermined value into one course network; and a network update step of generating a course network at a predetermined period and updating the course network by comparing it with previously generated course networks; and, at the network update step, a course network that has not been previously generated may be added as a new network when the course network is found, and a course network that has not been used for a predetermined period from the present time may be classified as a weeded-out course network.

Moreover, the course guidance method may further include: a ship information specification step of specifying the type and size of the corresponding ship by checking information about the type and size of the ship previously submitted to Lloyd's Register for the issuance of the ship's IMO number and comparing it with the ship's IMO number; and the recommended course acquisition step may include: a shortest course acquisition step of, when a course request for sailing from a specific departure point to a specific destination is received, setting individual main points constituting course networks as nodes and acquiring the shortest course in light of the cost between the nodes by using a path search algorithm; a detour acquisition step of checking whether the shortest course acquired overlaps an area that is set as a dangerous area, and, when it is determined that they overlap each other, searching for a node that does not overlap the dangerous area and is present within a predetermined distance from the dangerous area, selecting the nodes as a detour point, and acquiring a course capable of bypassing the dangerous area by using the detour points; and a shortest detour acquisition step of, when there are a plurality of acquired detours, acquiring the shortest detour using the path search algorithm.

The above-described technical solutions are merely exemplary, and should not be construed as limiting the present invention. In addition to the above-described exemplary embodiments, there may be one or more additional embodiments described in the drawings and detailed description.

Advantageous Effects

As described above, according to various embodiments of the present invention, it may be possible to acquire an optimal course for each ship without installing various sensors for checking the ship for performance, so that the installation cost and annual maintenance cost of the sensors may be reduced.

In addition, the estimated time of arrival (ETA) of a ship may be more accurately predicted, so that the unnecessary acceleration of the ship may be reduced and the ship may be prevented from arriving excessively early and increasing waiting time, thereby reducing the cost.

Furthermore, guidance on an optimal course for each ship specification may be provided by taking into consideration the type and size of a ship in actual operation, so that there is an advantage in that the reliability of an acquired course is improved.

Effects according to various embodiments of the present invention are not limited to the above-mentioned effects, and other effects that are not mentioned will be clearly understood by those skilled in the art from the description of the claims.

MODE FOR INVENTION

Preferred embodiments of the present invention will be described in more detail with reference to the accompanying drawings, but already known technical parts will be omitted or abridged for the sake of brevity of description.

It should be noted that references to "one" or "an" embodiment of the invention are not necessarily directed to the same embodiment, but mean at least one embodiment.

In the following embodiments, terms such as first, second, etc. are used for the purpose of distinguishing one component from another rather than imparting limitative meanings.

In the following embodiments, a singular expression includes a plural expression unless the context clearly dictates otherwise.

In the following embodiments, terms such as include or have means that the features or components described in the specification are present, and do not preclude the possibility that one or more other features or components may be added thereto.

In the following embodiments, when a part is described as being "connected" with another part, it includes not only a case of being "directly connected" but also a case of being "indirectly connected" with a third member interposed therebetween.

In the drawings, the sizes of components may be exaggerated or reduced for the sake of convenience of description. For example, since the size and thickness of each component shown in the drawings are freely illustrated for the sake of convenience of description, the present invention is not necessarily limited to illustrated details.

<Description of Ship's Course Guidance System>

Figure 1:
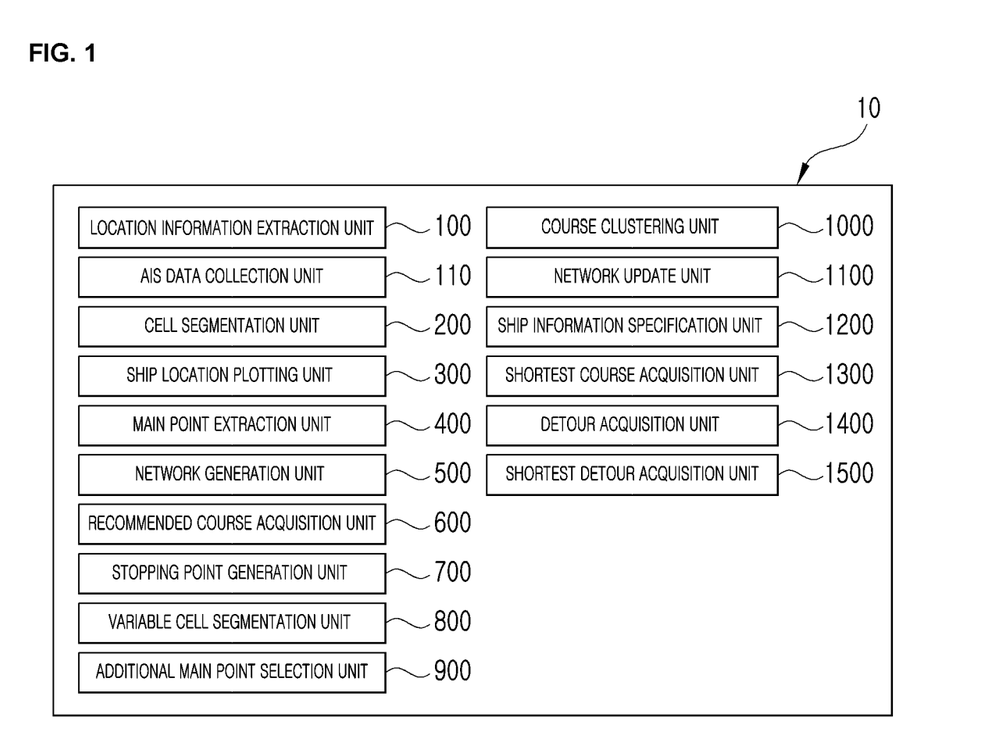
FIG. 1 is a block diagram schematically showing a ship's course guidance system according to an embodiment of the present invention.
Figure 5:
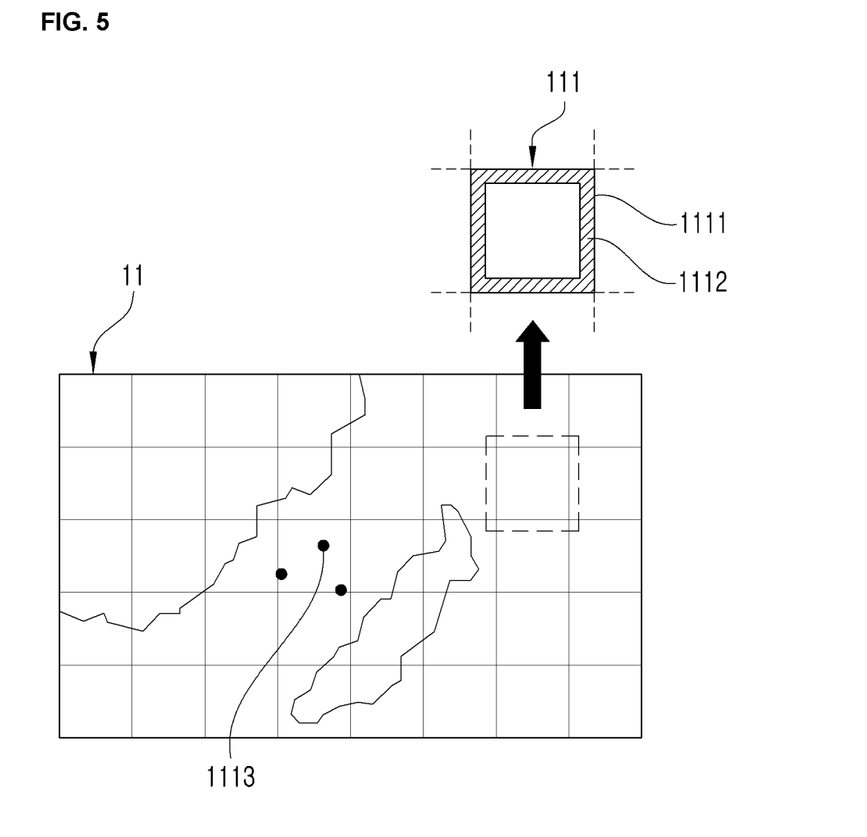
FIG. 5 is a conceptual diagram schematically showing a state in which the locations of a ship are plotted on an electronic navigational chart in an embodiment of the present invention.
Figure 6A:
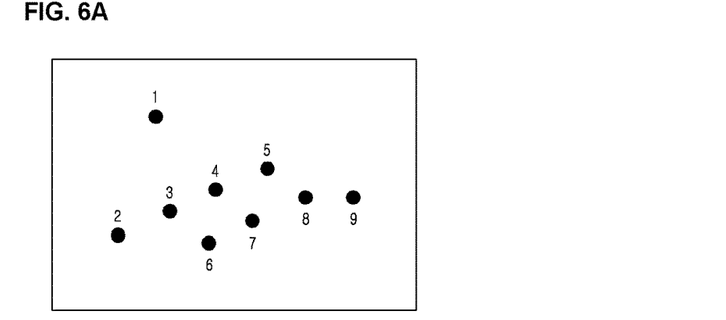
FIGS. 6A-6D are a conceptual diagram schematically showing a process of extracting clustered points as a main point in an embodiment of the present invention.
Figure 6B:
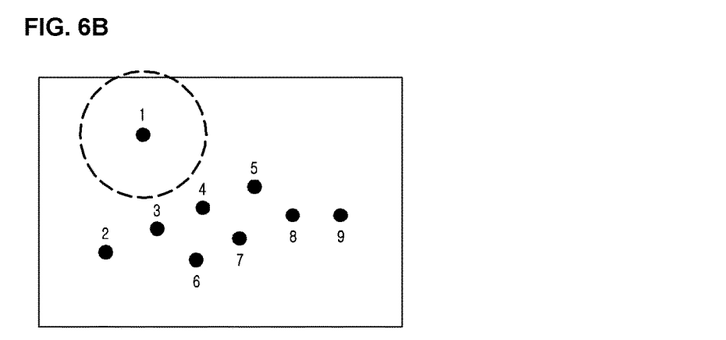
Figure 6C:
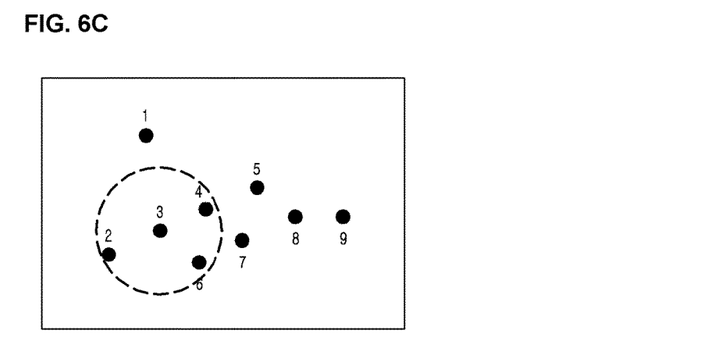
Figure 6D:
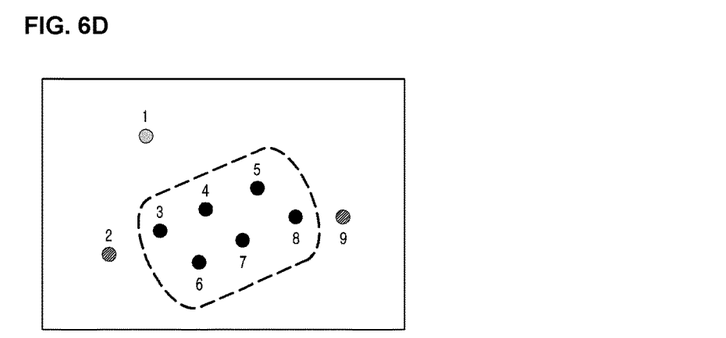
Figure 7A:
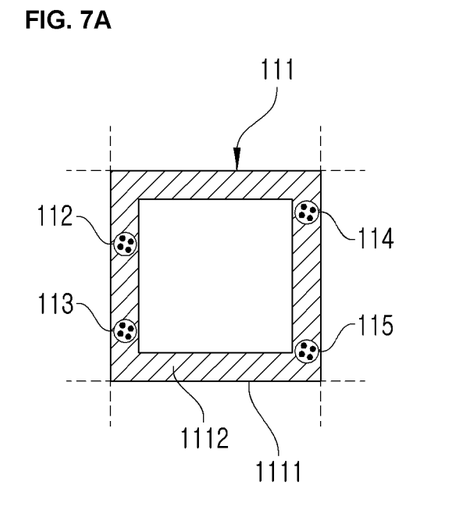
FIGS. 7A-7B are a conceptual diagram schematically showing a process of extracting points present in a main point selection area as main points in an embodiment of the present invention.
Figure 7B:
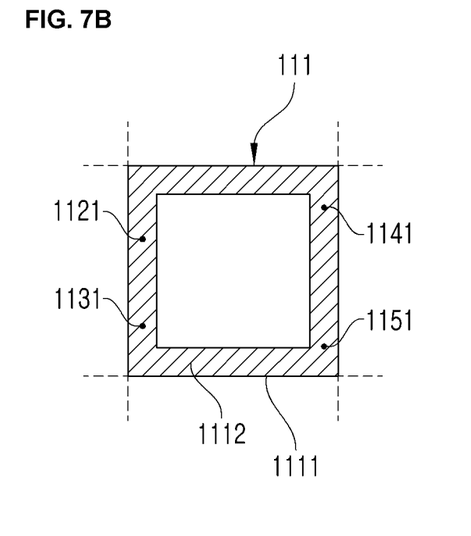
Figure 8A:
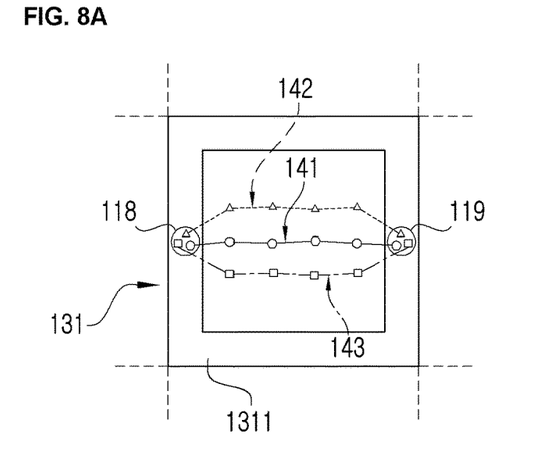
FIGS. 8A-8C are a conceptual diagram schematically showing a process of generating a course network in an embodiment of the present invention.
Figure 8B:
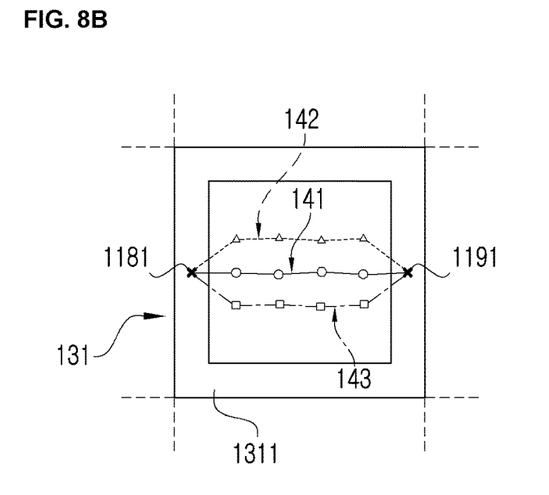
Figure 8C:
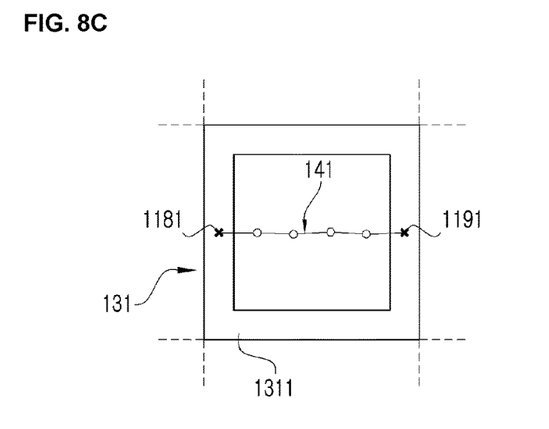
Figure 9A:
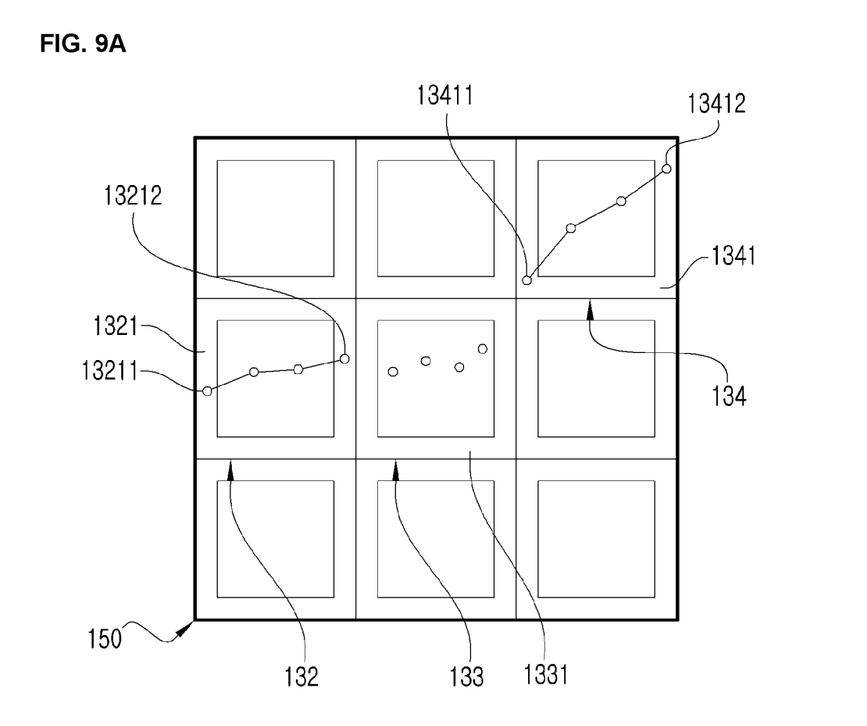
FIGS. 9A-9B are a conceptual diagram schematically showing a process of generating a course network by selecting virtual entry and exit points when entry and exit points are not present in a main point selection area within a cell in an embodiment of the present invention.
Figure 9B:
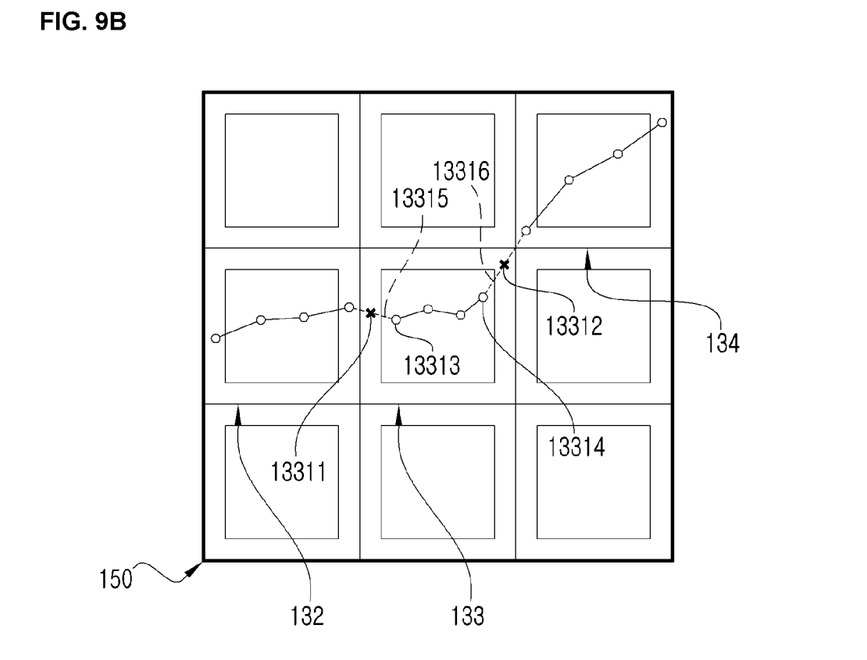
Figure 10A:
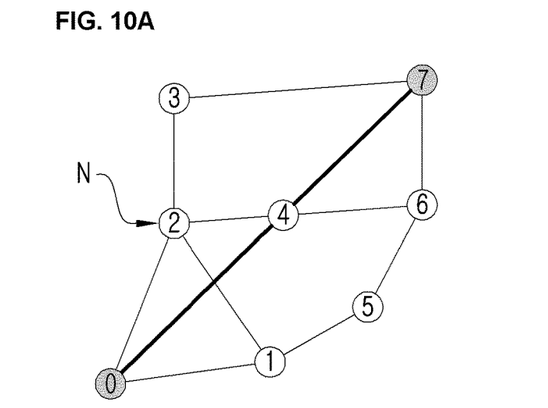
FIGS. 10A-10C are a conceptual diagram schematically showing a process of acquiring the shortest detour by bypassing a dangerous area when the shortest course acquired overlaps an area set as the dangerous area in an embodiment of the present invention.
Figure 10B:
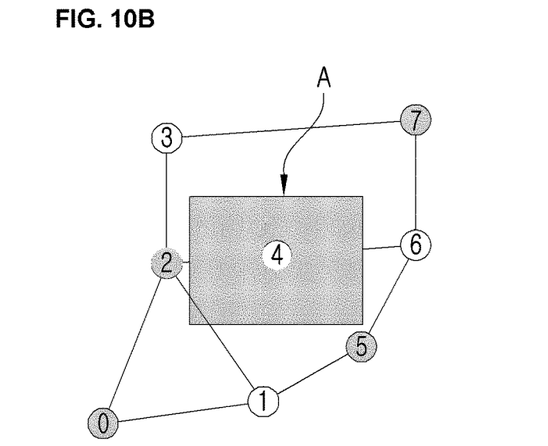
Figure 10C:
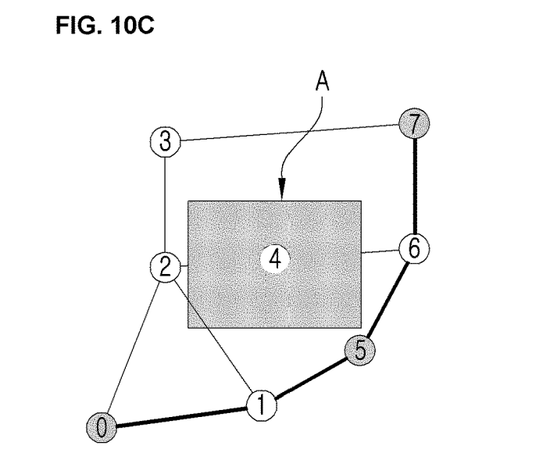

FIG. 1 is a block diagram schematically showing a ship's course guidance system according to an embodiment of the present invention, FIG. 5 is a conceptual diagram schematically showing a state in which the locations of a ship are plotted on an electronic navigational chart in an embodiment of the present invention, FIG. 6 is a conceptual diagram schematically showing a process of extracting clustered points as a main point in an embodiment of the present invention, FIG. 7 is a conceptual diagram schematically showing a process of extracting points present in a main point selection area as main points in an embodiment of the present invention, FIG. 8 is a conceptual diagram schematically showing a process of generating a course network in an embodiment of the present invention, FIG. 9 is a conceptual diagram schematically showing a process of generating a course network by selecting virtual entry and exit points when entry and exit points are not present in a main point selection area within a cell in an embodiment of the present invention, and FIG. 10 is a conceptual diagram schematically showing a process of acquiring the shortest detour by bypassing a dangerous area when the shortest course acquired overlaps an area set as the dangerous area in an embodiment of the present invention.

Referring to FIG. 1, a course guidance system 10 for the efficient sailing of a ship may include a location information extraction unit 100, an AIS data collection unit 110, a cell segmentation unit 200, a ship location plotting unit 300, a main point extraction unit 400, a network generation unit 500, a recommended course acquisition unit 600, a stopping point generation unit 700, a variable cell segmentation unit 800, an additional main point selection unit 900, a course clustering unit 1000, a network update unit 1100, a ship information specification unit 1200, a shortest course acquisition unit 1300, a detour acquisition unit 1400, and a shortest detour acquisition unit 1500.

First, the AIS data collection unit 110 may collect AIS data for each ship from a separate AIS database server (not shown) in which the AIS data of each ship in operation is stored, and may store the collected AIS data. The AIS data may include dynamic data and static data, and the static data may include information about the IMO number, name, length, width, type, and/or like of each ship. In addition, the dynamic data may include information about the speed, location information (latitude, and longitude), bow direction, turnover, and/or like of each ship.

The location information extraction unit 100 may check the AIS data collected by the AIS data collection unit 110, and may extract location information for each IMO number of each ship. The ship location plotting unit 300 may determine the location information of the ship extracted by the location information extraction unit 100 on a per-time basis, and may plot the location point 1113 of the ship on an electronic navigational chart 11 stored in advance. In the present specification, the location point of a ship refers to a point indicating the location to which the ship corresponds on the electronic navigational chart 11.

Referring to FIG. 5, the cell segmentation unit 200 may segment the overall area of the electronic navigational chart 11 into cells 111. In this case, the cells 111 refer to square shapes having a specific size. Furthermore, the cell segmentation unit 200 may allocate a main point selection area 1112 inside each cell 111. In one embodiment, the main point selection area 1112 may be formed along the boundary line 1111 of the cell 111, in which case it may be formed to have a specific area in the direction of the center of the cell 111 from the boundary line 1111 of the cell 111.

The main point extraction unit 400 may cluster points (i.e., location points indicating the locations of ships) present in the main point selection area 1112 according to predetermined criteria, and may extract the clustered points as one main point. The main point extraction unit 400 according to an embodiment may cluster the location points of ships using a density-based spatial clustering of applications with noise (DBSCAN), which is a density-based clustering algorithm. More specifically, the DBSCAN algorithm receives the inputs of a specific radius (eps) for search of a surrounding space around arbitrary data and the minimum number of pieces of data within the radius (minPts) for recognition as a cluster. The main point extraction unit 400 forms a cluster when a predetermined number or more of location points are present within a circle having a predetermined radius by using the DBSCAN algorithm, and expands the cluster by performing the same inspection based on the neighboring location points. Referring to FIG. 6 as an example, the main point extraction unit 400 sequentially examines location points 1 to 9 in order to cluster nine location points. In this case, when the size of the radius is set based on each location point, a circle may be drawn as shown in FIG. 6B, and the minimum number of pieces of data to be included in the circle may be set to a specific number (e.g., 4). FIG. 6C shows a circle drawn around the location point 3. In this case, there are four location points in the circle, and thus the location point 3 may be classified as a core point. When all the location points 1 to 9 are clustered in this manner, six core points may be acquired, as shown in FIG. 6D. The main point extraction unit 400 may select any one location point from among the six core points and extract it as one main point.

Referring to FIG. 7, the main point extraction unit 400 may classify points present in the main point selection area 1112 into a first group 112, a second group 113, a third group 114, and a fourth group 115 by clustering the points, and may extract a first main point 1121, a second main point 1131, a third main point 1141, and a fourth main point 1151 by selecting any one location point for each group.

Furthermore, the main point extraction unit 400 may classify main points present in the same main point selection area into entry and exit points by analyzing the main points on a per-time basis. In this case, the entry point refers to a point at the time when a ship enters the main point selection area, whereas the exit point refers to a point at the time immediately before a ship leaves the same main point selection area. Referring to FIG. 8A, the locations of three ships are plotted in the cell 131 when the three ships move from left to right. In this case, the main point extraction unit 400 may classify points present in a main point selection area 1311 into a fifth group 118 and a sixth group 119 by clustering the points, and may extract a fifth main point 1181 and a sixth main point 1191 by selecting any one location point for each group. In addition, the main point extraction unit 400 analyzes the fifth main point 1181 and the sixth main point 1191 present in the same main point selection area 1311 on a per-time basis, and classifies the fifth main point 1181 as an entry point and the sixth main point 1191 as an exit point. In other words, since the location information of a ship may be determined on a per-time basis by the ship location plotting unit 300, the main point extraction unit 400 may classify the fifth main point 1181 preceding the sixth main point 1191 as an entry point and the sixth main point 1191 as an exit point.

The network generation unit 500 generates a course network by connecting the resulting entry and exit points to each other, in which case, when the course network is generated, the location of the ship based on the location information may be incorporated thereinto. Referring to FIG. 8B as an example, the location points of the ships may be plotted in the cell 131 on a per-time basis by the ship location plotting unit 300, and the network generation unit 500 may generate one course network by connecting the fifth main point 1181, which is an entry point, and the sixth main point 1191, which is an exit point, to each other. In this case, the actual location points of the ship may be included on the course network that is generated by connecting the entry and exit points to each other. In other words, since the course network generated by the network generation unit 500 is generated based on the actual courses of ships, the reliability of the course may be improved.

The recommended course acquisition unit 600 may select a recommended course from a plurality of course networks generated by the network generation unit 500 by taking into consideration at least one of a shortest condition and an obstacle condition. In an embodiment, the shortest condition may include at least one of the movement distance and movement time of the ship, and the obstacle condition may include at least one of weather information and dangerous area information. In an embodiment, the dangerous area may be applied as a typhoon occurrence area or a pirate-infested area, and the weather information may be applied as information on wind, atmospheric pressure, water temperature, swell, or wave height.

The recommended course acquisition unit 600 may determine the recommended course by taking into consideration the obstacle condition when selecting the recommended course. For example, the recommended course acquisition unit 600 may check a weather condition for each cell 111 or 121 and determine whether the corresponding ship is operable. As a more specific example, the recommended course acquisition unit 600 may integrate information on wind, atmospheric pressure, water temperature, swell, and wave height, and may recommend a course with low external weather force as a recommended course through a separate algorithm designed to calculate external weather force based on the type and size of a ship. In general, as external weather force increases, the fuel consumption of a ship passing through a corresponding area also increases. Accordingly, the recommended course acquisition unit 600 may contribute to the fuel saving of a ship by acquiring a course with low external weather force. Furthermore, the recommended course acquisition unit 600 may select the recommended course in a manner of avoiding a dangerous area. Moreover, the recommended course acquisition unit 600 may receive information on weather or dangerous areas through a separate obstacle condition data server (not shown).

In an embodiment, the recommended course acquisition unit 600 may include the shortest course acquisition unit 1300, the detour acquisition unit 1400, and the shortest detour acquisition unit 1500. When a course request for sailing from a specific departure point to a specific destination is received, the shortest course acquisition unit 1300 may set individual main points constituting course networks as nodes N, and may acquire the shortest course in light of the cost between the nodes N by using a path search algorithm. In an embodiment, a known shortest path algorithm, an all path algorithm, Dijkstra's algorithm, or an A* algorithm may be applied as the path search algorithm. Any known algorithm may be used as long as the algorithm searches for the shortest path in light of cost values between nodes N constituting each path.

The following description will be given with reference to FIG. 10A. When a course request for sailing from a specific departure point 0 to a specific destination 7 is received, the shortest course acquisition unit 1300 sets eight main points 0 to 7 constituting a plurality of course networks as nodes N, and acquires the shortest course by taking into consideration the cost between the nodes N. In this case, the cost refers to the cost required to move between the nodes N. For example, the cost between the nodes N may be determined in such a manner that the cost increases as the movement distance or movement time between the nodes N increases and the cost decreases as the movement distance or movement time between the nodes N decreases. As a result of taking into consideration the cost between the nodes N through the shortest course acquisition unit 1300, a course network connecting nodes 0, 4, and 7 may be acquired as the shortest course.

The detour acquisition unit 1400 may check whether the shortest course acquired by the shortest course acquisition unit 1300 overlaps an area that is set as a dangerous area A. When it is determined that they overlap each other, the detour acquisition unit 1400 may search for nodes N that do not overlap the dangerous area A and are present within a predetermined distance from the dangerous area A, may select the nodes N as detour points, and may acquire a course capable of bypassing the dangerous area A by using the nodes N.

Referring to FIG. 10B, in the case where the detour acquisition unit 1400 identifies a dangerous area A (e.g., a pirate-infested area), when it is determined that the shortest course acquired by the shortest course acquisition unit 1300 overlaps the dangerous area A, the detour acquisition unit 1400 may search for nodes N that do not overlap the dangerous area A and are present within a predetermined distance from the dangerous area A, and may select nodes 2 and 5 as detour points. In other words, the detour acquisition unit 1400 may acquire a detour capable of bypassing the dangerous area A among a plurality of courses from a departure point (node 0) to a destination (node 7). For example, the detour acquisition unit 1400 may acquire a first detour from node 0 through node 2 and node 3 to node 7 by using node 2, which is a detour point. Furthermore, the detour acquisition unit 1400 may acquire a second detour from node 0 through node 1, node 5, and node 6 to node 7 by using node 5, which is a detour point.

The shortest detour acquisition unit 1500 may acquire the shortest detour by using a path search algorithm when there is a plurality of detours acquired by the detour acquisition unit 1400. Referring to FIG. 10C, the shortest detour acquisition unit 1500 may acquire the shortest detour by comparing the cost between nodes N constituting the first detour and the cost between nodes N constituting the second detour with each other and selecting the second detour, incurring a relatively low cost, between the first detour and the second detour.

Meanwhile, the stopping point generation unit 700 may select each point having the same per-time location for a predetermined period from among ship location points plotted on the electronic navigational chart 11 by the ship location plotting unit 300 as a stopping point, and may cluster a plurality of selected stopping points into a main stopping point. In one embodiment, the stopping point corresponds to the location of a port where a ship is actually anchored.

In other words, the stopping point generation unit 700 may consider each location point without a change in location for a predetermined period to be a stopping point, and may generate one stopping point by clustering resulting stopping points. Since the method by which the stopping point generation unit 700 generates one stopping point by clustering resulting stopping points may be performed using a clustering algorithm like the method performed by the main point extraction unit 400, a redundant description thereof will be omitted. In an embodiment, a main stopping point for each ship may be generated through the stopping point generation unit 700, through which an accessible port may be estimated for each ship specification (e.g., the type and size of each ship).

Referring to FIG. 9, the variable cell segmentation unit 800 may re-segment the overall area of the electronic navigational chart 11 using variable cells 131, 132, 133, and 134 having a size different from that of the cells 111, and 121 made by the cell segmentation unit 200. In this case, the variable cell segmentation unit 800 may allocate an additional main point selection area 1312 inside the variable cell 131. In one embodiment, the additional main point selection area 1312 may be formed along the boundary line 1311 of the variable cell 131, in which case it may be formed to have a specific area in the direction of the center of the variable cell 131 from the boundary line 1311 of the variable cell 131.

The additional main point selection unit 900 may check whether entry and exit points are present within each main point selection area, and may generate virtual entry and exit points in a main point selection area in which entry and exit points are not present (hereinafter referred to as a 'non-included area'). Referring to FIG. 9A, when an entry point 13211 or 13411 and an exit point 13212 or 13412 are present in the main point selection area 1321 or 1341 of each cell 132 or 134, a course network connecting the entry point 13211 or 13411 and the exit point 13212 or 13412 may be generated. In contrast, in the case of the cell 133 in which entry and exit points are not present in the main point selection area 1331, there is a possibility that a course network may not be generated. Accordingly, the additional main point selection unit 900 may set a search area 150 including a plurality of cells, may check whether entry and exit points are present in each of all main point selection areas within the search area 150, may make lines 13315 and 13316 passing through the non-included area 1331 by connecting one 13313 or 13314 of the location points of the ship plotted in the cell 133 having the non-included area with the entry point 13411 or exit point 13212 of each of the cells 132 and 134 adjacent to the cell 133 having the non-included area, and may select any one of points constituting each of the lines 13315 and 13316 as a virtual entry point 13311 or exit point 13312, thereby enabling a course network to be generated even in a cell in which entry and exit points are not present.

The course clustering unit 1000 may determine the similarities between course networks using a Hausdorff distance algorithm, and may cluster course networks having a similarity equal to or higher than a predetermined value into one course network.

In an embodiment, the Hausdorff distance algorithm used as the method by which the course clustering unit 1000 determines the similarities between course networks is a method of representing the similarity between two objects numerically. The more similar the two objects, the smaller the value of the Hausdorff distance H. In contrast, the more dissimilar the two objects, the larger the value of the Hausdorff distance H. For example, in order to obtain a Hausdorff distance between two objects A and B, d(A,B) and d(B,A) are individually calculated, as in Equation 1 below:

$$d(A, B) = \max_{a \in A} \{\min_{b \in B}\{d(a, b)\}\} \quad (1)$$
$$d(B, A) = \max_{b \in B} \{\min_{a \in A}\{d(b, a)\}\}$$

In the above equation, 'a' is the coordinate of any point belonging to 'A', and 'b' is the coordinate of any point belonging to 'B'. d(a,b) is the Euclidean distance between points a and b. Accordingly, d(A,B) refers to the largest one of the minimum values among the distances from any point belonging to object A to any point of object B, and d(B,A) refers to the largest one of the minimum values among the distances from any point belonging to object B to any point of the object A. Based on Equation 1 above, the Hausdorff distance H(A,B) refers to a larger value between d(A,B) and d(B,A), as shown in Equation 2 below:

$$H(A,B)=\max(d(A,B),d(B,A)) \quad (2)$$

Since a method of calculating a Hausdorff distance has already been known (see Dubuisson, M. P. and Jain, A. K. 1994. A Modified Hausdorff Distance for Object Matching. ICPR 94 (1): 566-568), a further detailed description thereof will be omitted.

The course clustering unit 1000 may compare a plurality of course networks generated by the network generation unit 500 with each other, and, when it is determined through the Hausdorff distance algorithm that the similarity between course networks is equal to or higher than a predetermined value, may select any network and delete course networks other than the selected network, thereby enabling course networks having a high similarity to be filtered into one course network. Referring to FIGS. 8B and 8C, the course clustering unit 1000 may calculate the similarities of a first course 141, a second course 142, and a third course 143 passing through a fifth main point 1181, which is an entry point, and a sixth main point 1191, which is an exit point, and, when the similarity between the second course 142 and the third course 143 is equal to or higher than the predetermined value based on the first course 141, may leave only the first course 141 and delete the second course 142 and the third course 143. In other words, the course clustering unit 1000 may improve data processing efficiency of the overall system by simplifying complex course networks.

The network update unit 1100 may update the course network by comparing it with previously generated course networks at regular intervals. For example, the network update unit 1100 may add a course network that has not been previously generated as a new network when the course network is found, and may classify a course network that has not been used for a predetermined period from the present time as a weeded-out course network. In an embodiment, the network update unit 1100 may control the main point extraction unit 400 and the network generation unit 500 to extract main points at intervals of a predetermined period (e.g., one month) and generate a course network based on the extracted main points. The network update unit 1100 may compare the newly generated course network with the previously generated course networks, and, when it is determined that the newly generated course network has not been present before, may add and store the newly generated course network as a new network. Furthermore, the network update unit 1100 may compare the course networks with the location points of a ship that has actually moved for a predetermined period, and may classify an existing course network that is determined not to be used for a predetermined period (e.g., one month) from the present time as a weeded-out course network and store the existing course network separately.

The ship information specification unit 1200 may specify the type and size of the ship by checking information about the type and size of the ship previously submitted to Lloyd's Register for the issuance of the ship's IMO number and comparing it with the ship's IMO number. In an embodiment, the ship information specification unit 1200 may receive information about the type of ship and a ship for each IMO number previously submitted to Lloyd's Register from a separate ship specification storage server (not shown). Since the ship's IMO number has already been ensured by the location information extraction unit 100, the ship information specification unit 1200 may specify the type and size of the ship by matching the received information about the type of ship and the ship with the ship's IMO number.

<Description of Course Guidance Method>

Figure 2:
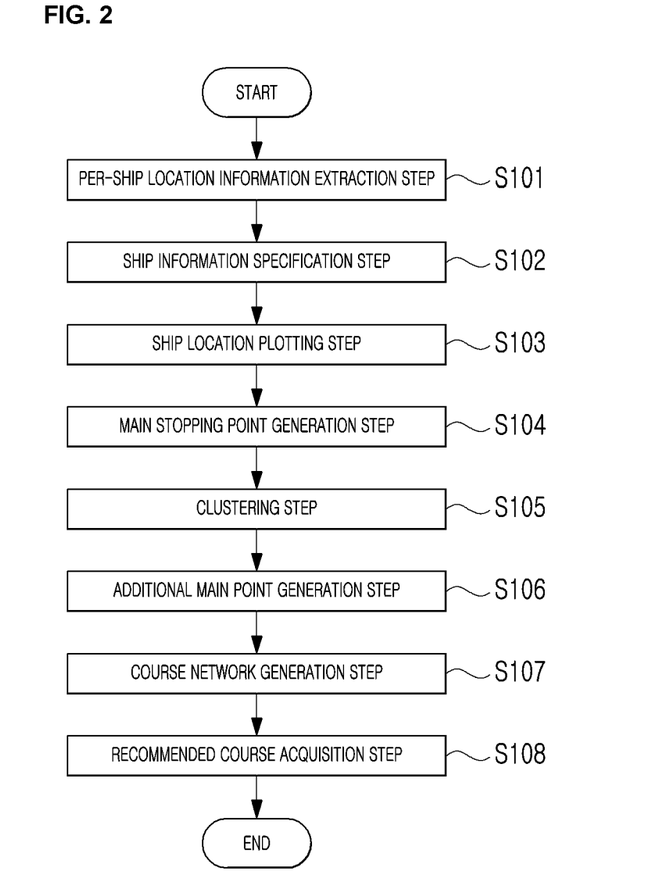
FIG. 2 is a flowchart schematically showing a ship's course guidance method according to an embodiment of the present invention.

A course guidance method according to an embodiment of the present invention will be described according to the flowchart shown in FIG. 2. The description will be made with reference to the drawings shown in FIGS. 1 to 10, and will be given in sequence for the sake of convenience.

1. Per-Ship Location Information Extraction Step <S101>

At this step, the location information extraction unit 100 may extract per-ship location information from collected Auto Identification System (AIS) data. More specifically, the location information extraction unit 100 may check the AIS data collected by the AIS data collection unit 110, and may extract location information for each IMO number of each ship.

2. Ship Information Specification Step <S102>

After step S101, at this step, the ship information specification unit 1200 may receive information about the type of ship and a ship for each IMO number previously submitted to Lloyd's Register from a separate ship specification storage server, and may match the received information about the type of ship and a ship with the IMO number of the ship ensured by the location information extraction unit 100, thereby enabling the type and size of the corresponding ship to be specified.

3. Ship Location Plotting Step <S103>

After step S102, at this step, the ship location plotting unit 300 may determine the location information of the ship extracted by the location information extraction unit 100, and may plot the location point of the ship on the electronic navigational chart 11 previously stored in a chart storage unit (not shown). In addition, at this step, the overall area of the electronic navigational chart 11 is segmented into square-shaped cells 111 having a predetermined size by the cell segmentation unit 200. The main point selection area 1112 may be formed along the boundary line 1111 of each cell 111, in which case it may be formed to have a predetermined area in the direction of the center of the cell 111 from the boundary line 1111 of the cell 111.

4. Main Stopping Point Generation Step <S104>

After step S103, at this step, the stopping point generation unit 700 may select each point having the same per-time location for a predetermined period among ship locations plotted on the electronic navigational chart 11 as a stopping point, and may generate a main stopping point by clustering a plurality of selected stopping points.

5. Clustering Step <S105>

After step S104, at this step, the main point extraction unit 400 may cluster points located within a predetermined area among the plurality of points plotted on the electronic navigational chart 11, and may extract the clustered points as one main point. More specifically, the main point extraction unit 400 may cluster location points present in the main point selection area 1112, and may extract the clustered location points as main points. Furthermore, the main point extraction unit 400 may analyze main points present in the same main point selection area on a per-time basis, and may classify them into entry and exit points.

6. Additional Main Point Generation Step <S106>

After step S105, at this step, the additional main point selection unit 900 may check whether entry and exit points are present within each main point selection area, and may generate virtual entry and exit points in a main point selection area in which entry and exit points are not present. More specifically, the additional main point selection unit 900 may make lines 13315 and 13316 passing through the non-included area 1331 by connecting one 13313 or 13314 of the location points of the ship plotted in the cell 133 having the non-included area with the entry point 13411 or exit point 13212 of each of the cells 132 and 134 adjacent to the cell 133 having the non-included area, and may select any one of points constituting the lines 13315 and 13316 as a virtual entry point 13311 or exit point 13312.

7. Course Network Generation Step <S107>

Figure 3:
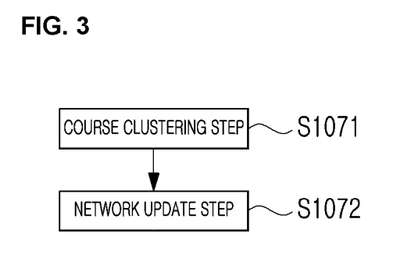
FIG. 3 is a flowchart showing a course network generation step according to an embodiment of the present invention in detail.

After step S105, at this step, each course network may be generated by connecting the resulting entry and exit points to each other. In this case, when the course network is generated, the location of the ship based on the location information may be incorporated thereinto. Since the location points of the ship are plotted in the cell 131 on a per-time basis by the ship location plotting unit 300, the network generation unit 500 may generate one course network by connecting the entry and exit points to each other. In this case, the actual location points of the ship may be included on the course network that is generated by connecting the entry and exit points to each other. According to an embodiment, this step may be subdivided into a course clustering step and a network update step.

7-1. Course Clustering Step <S1071>

At this step, the course clustering unit 1000 may determine the similarities between the course networks using a Hausdorff distance algorithm, and may cluster course networks having a similarity equal to or higher than a predetermined value into one course network. For example, when there is a plurality of course networks passing through the same main points, the course clustering unit 1000 may calculate the similarities between courses based on any course, and, when the similarity is equal to or higher than a predetermined value, may leave only a reference course and delete the remaining courses.

7-2. Network Update Step <S1072>

At this step, the network update unit 1100 may generate a course network at regular intervals, and may update the course network by comparing it with previously generated course networks. For example, the main point extraction unit 400 and the network generation unit 500 may be controlled to extract main points and generate a corresponding course network on a monthly basis, the newly generated course network may be compared with the previously generated course networks, and the newly generated course network may be added and stored as a new network when it is determined that the course network has not been present. Furthermore, the network update unit 1100 may classify an existing course network that has not been used for one month from the present time as a weeded-out course network and store the existing course network separately.

8. Recommended Course Acquisition Step <S108>

Figure 4:
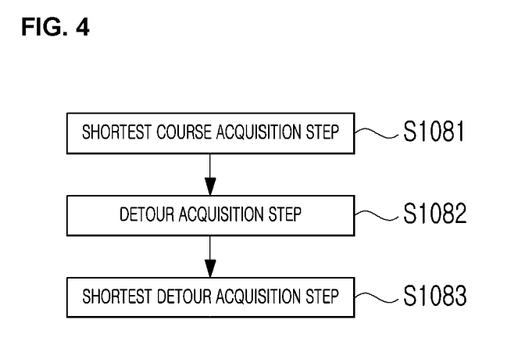
FIG. 4 is a flowchart showing a recommended course acquisition step according to an embodiment of the present invention in detail.

After step S107, at this step, the recommended course acquisition unit 600 may acquire a recommended course for each ship based on the generated course networks of the ship. More specifically, the recommended course acquisition unit 600 may select a recommended course from a plurality of generated course networks by taking into consideration at least one of a shortest condition and an obstacle condition. According to an embodiment, the present step may include a shortest course acquisition step, a detour acquisition step, and a shortest detour acquisition step.

8-1. Shortest Course Acquisition Step <S1081>

At this step, when a course request for sailing from a specific departure point to a specific destination is received, the shortest course acquisition unit 1300 may set individual main points constituting the course networks as nodes N, and may acquire the shortest course in light of the cost between the nodes N by using a path search algorithm.

8-2. Detour Acquisition Step <S1082>

At this step, the detour acquisition unit 1400 may check whether the shortest course acquired by the shortest course acquisition unit 1300 overlaps an area that is set as a dangerous area A. When it is determined that they overlap each other, the detour acquisition unit 1400 may search for nodes N that do not overlap the dangerous area A and are present within a predetermined distance from the dangerous area A, may select the nodes N as detour points, and may acquire a course capable of bypassing the dangerous area A by using the nodes N.

8-3. Shortest Detour Acquisition Step <S1083>

At this step, when there is a plurality of detours acquired by the detour acquisition unit 1400, the shortest detour acquisition unit 1500 may acquire the shortest detour having the lowest cost among the plurality of detours by using a path search algorithm.

As described above, according to various embodiments of the present invention, it may be possible to acquire an optimal course for each ship without installing one or more sensors on the ship, so that there is an effect in that the cost required for acquiring an optimal course is reduced compared to the sensor method.

The conventional method of providing guidance on a course using past track data included in AIS data can provide guidance on only the same course that has been taken in the past, so that it is lacking in suggesting an optimal course by taking into consideration unexpected variables and circumstances. AIS data has a disadvantage in that data processing efficiency is lowered because a vast amount of course data is accumulated over time. However, according to various embodiments of the present invention, data is processed on a per-specific size cell or per-variable cell basis, and the update of a course network is also made on a per-cell or per-variable cell basis, so that there is an effect in that excellent data processing efficiency is obtained by distributing resources.

In addition, according to various embodiments of the present invention, guidance on an optimal course for each ship specification may be provided by taking into consideration the type and size of a ship in actual operation, so that there is an advantage in that the reliability of an acquired course is improved. In other words, a main stopping point is extracted according to the type and size of a ship, and this may be used as port information optimized for each ship specification.

In addition, in embodiments of the present invention, course networks may be constructed by extracting courses along which a ship can actually sail based on AIS data, and the course networks may be subdivided according to the type and size of the ship. Accordingly, a course along which a ship can actually sail may be recommended in a state in which a ship specification is taken into consideration, so that there is an advantage in that the reliability of the recommended course is high when a course plan is established.

Furthermore, the IMO number of a ship may be identified through collected AIS data, the actual operation status of the ship for the IMO number may be checked, and the specification information of the ship in actual operation may be verified through ship information previously submitted to Lloyd's Register, thereby enabling a course to be acquired based on accurate ship information.

In addition, whether entry and exit points are present in a main point selection area may be checked, and virtual entry and exit points may be generated in a main point selection area in which entry and exit points are not present, thereby enabling a course network to be constructed even in a cell in which entry and exit points are not present. Accordingly, when a course network is generated, a more precise course may be generated.

As described above, although the detailed description of the present invention has been made using the embodiments with reference to the accompanying drawings, the above-described embodiments have been described merely via preferred examples of the present invention. Accordingly, the present invention should not be understood as being limited only to the above embodiments, but the scope of the present invention should be understood as being based on the following claims and their equivalents.

The invention claimed is:

1. A course guidance method for efficient sailing of a ship, the course guidance method being performed by a ship's course guidance system; the course guidance method comprising:
   a per-ship location information extraction step of extracting location information for each ship from collected Auto Identification System (AIS) data;
   a ship location plotting step of plotting a location of the ship based on the location information on an electronic navigational chart;
   a clustering step of clustering points located within a predetermined area among a plurality of points plotted on the electronic navigational chart;
   a course network generation step of generating ship course networks using the clustered points; and
   a recommended course acquisition step of acquiring a recommended course for each ship based on the generated ship course networks, wherein:
at the per-ship location information extraction step, location information is extracted for each International Maritime Organization (IMO) number of a corresponding ship;
at the ship location plotting step, an overall area of the electronic navigational chart is segmented into square-shaped cells having a predetermined size, and a main point selection area formed along a boundary line of each of the cells and also formed to have a predetermined area in a direction of a center of the cell from the boundary line of the cell is included in the cell;
at the clustering step points present in the main point selection area are clustered, the clustered points are extracted as main points and main points present n the same main point selection area are analyzed on a per-time basis and classified into entry and exit points;
at the course network generation step, a course network is generated by connecting the entry and exit points, in which case the location of the ship based on the location information is incorporated into the course network; and
at the recommended course acquisition step, a recommended course is selected from a plurality of generated course networks by taking into consideration at least one of a shortest condition and an obstacle condition, the shortest condition includes at least one of a movement distance and movement time of the ship, and the obstacle condition includes at least one of weather information and dangerous area information.

2. The course guidance method of claim 1, wherein:
the course network generation step comprises:
a course clustering step of determining similarities between course networks using a Hausdorff distance algorithm and clustering course networks having a similarity equal to or higher than a predetermined value into one course network; and
a network update step of generating a course network at a predetermined period and updating the course network by comparing it with previously generated course networks; and
at the network update step, a course network that has not been previously generated is added as a new network when the course network is found, and a course network that has not been used for a predetermined period from the present time is classified as a weeded-out course network.

3. The course guidance method of claim 1, further comprising:
a main stopping point generation step of selecting each point having a same per-time location for a predetermined period among the ship locations plotted on the electronic navigational chart as a stopping point, and generating a plurality of selected stopping points as a main stopping point by clustering the selected stopping points; and
an additional main point selection step of checking whether entry and exit points are present in the main point selection area, and generating virtual entry and exit points in a main point selection area in which entry and exit points are not present (hereinafter referred to as the 'non-included area');
wherein at the additional main point selection step, lines passing through the non-included area are made by connecting one of the location points of the ships plotted in the cell having the non-included area with an entry or exit point of each of the cells adjacent to the cell having the non-included area, and any one of points constituting each of the lines is selected as a virtual entry or exit point.

4. The course guidance method of claim 2, further comprising:
a ship information specification step of specifying a type and size of the corresponding ship by checking information about a type and size of the ship previously submitted to Lloyd's Register for an issuance of the ship's IMO number and comparing it with the ship's IMO number;
wherein the recommended course acquisition step comprises:
a shortest course acquisition step of, when a course request for sailing from a specific departure point to a specific destination is received, setting individual main points constituting course networks as nodes and acquiring a shortest course in light of a cost between the nodes by using a path search algorithm;
a detour acquisition step of checking whether the shortest course acquired overlaps an area that is set as a dangerous area, and, when it is determined that they overlap each other, searching for a node that does not overlap the dangerous area and is present within a predetermined distance from the dangerous area, selecting the nodes as a detour point, and acquiring a course capable of bypassing the dangerous area by using the detour points; and
a shortest detour acquisition step of, when there are a plurality of acquired detours, acquiring a shortest detour using the path search algorithm.

* * * * *